June 30, 1936. I. M. STEIN 2,045,970
ELECTRICAL MEASURING
Filed June 29, 1933 8 Sheets-Sheet 5

INVENTOR.
Irving M. Stein
BY
Cornelius D. Ehret
ATTORNEY.

June 30, 1936.  I. M. STEIN  2,045,970
ELECTRICAL MEASURING
Filed June 29, 1933  8 Sheets-Sheet 6

INVENTOR.
Irving M. Stein
BY
Cornelius D. Ehret
his ATTORNEY.

June 30, 1936.  I. M. STEIN  2,045,970

ELECTRICAL MEASURING

Filed June 29, 1933   8 Sheets-Sheet 7

INVENTOR.
Irving M. Stein
BY
Cornelius D. Ehret
his ATTORNEY.

June 30, 1936.  I. M. STEIN  2,045,970
ELECTRICAL MEASURING
Filed June 29, 1933   8 Sheets-Sheet 8

Fig. 21.

INVENTOR.
Irving M. Stein
BY
Cornelius D. Ehret
ATTORNEY.

Patented June 30, 1936

2,045,970

UNITED STATES PATENT OFFICE 2,045,970

ELECTRICAL MEASURING

Irving M. Stein, Philadelphia, Pa., assignor to Leeds & Northrup Company, Philadelphia, Pa., a corporation of Pennsylvania Application June 29, 1933, Serial No. 678,185

13 Claims. (Cl. 177—351)

My invention relates to methods of and apparatus for electrically measuring, recording or controlling the magnitude of, or variations in magnitude of a condition, as pressure, weight, temperature, specific gravity, rate of flow, etc.

In accordance with my invention, the measuring circuit includes a current path, between electrodes immersed in a conductive liquid, whose conductance is varied by movement therein of a plunger or equivalent displacing structure whose conductivity is substantially or suitably different from the conductivity of the liquid and whose movement is effected in response to change of the condition under measurement.

More specifically and in accordance with certain forms of my invention, a column of the liquid and immersed contacts comprise two arms of a Wheatstone bridge, the resistance of one or both of which is varied by displacement of part of the liquid by the plunger.

My invention also resides in the methods and arrangements hereinafter described and claimed.

For an understanding of my invention and for illustration of various forms thereof reference is to be had to the accompanying drawings in which.

There exists arrangements in which a resistance dips into a column of mercury responsive to changes in pressure, for example, so that as the mercury rises or falls, less or more of the resistance is clear of the mercury and effectively in circuit, the surface of the mercury serving as variable or slidable contact. These arrangements have the serious disadvantage, among others, that due to surface contamination the contact resistance between the mercury and the conductor is not constant but subject to more or less erratic variations so that the variation of resistance is not smoothly continuous as the mercury level changes.

Other known arrangements provide a plurality of conductors of varying length which are successively engaged as the mercury level rises to connect resistance in circuit. At best, the arrangement is crude because the resistance variation is by steps rather than continuous. Moreover, as above stated, the contact resistance is not constant due to surface contamination so that variable error is introduced.

In both types, the mercury is used simply as a contact whereas as will hereinafter appear, the mercury or other conductive liquid is, in accordance with my invention, the variable resistance element itself, and the contacts for including it in circuit are at all times immersed to avoid any variation due to surface contamination.

Figures 1, 2, 3, 6, 8:
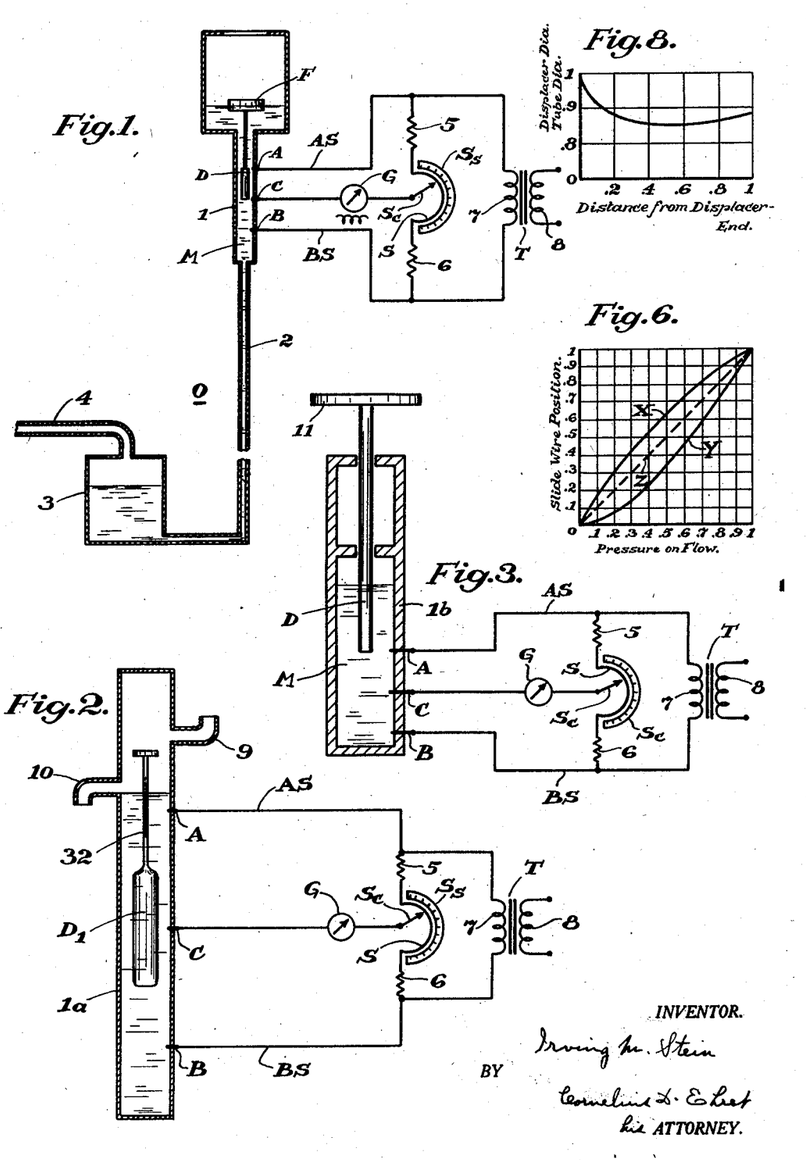
Fig. 1 diagrammatically illustrates a system for measuring pressure.
Fig. 2 diagrammatically illustrates a system for measuring specific gravity.
Fig. 3 diagrammatically illustrates a system for measuring weight.
Fig. 6 illustrates characteristic curves of the device of Fig. 5.
Fig. 8 is an explanatory figure discussed in connection with Fig. 7.

Referring to Fig. 1, the contacts A and B pass through the wall of the tube 1 of suitable insulating material for contact with the column of conductive liquid M therein, for example, mercury; the path between these points having a definite resistance depending upon the distance between the contacts, the specific conductance of the liquid, and the cross sectional area of the path. The member D of material differing substantially in specific conductance from the liquid, and preferably of tantalum covered by insulating material, is movable in the tube as specifically hereinafter described, to vary the current distribution in cross-sectional area of the liquid between the points A and C, by displacing or isolating more or less of the liquid. Assuming the member D to be of lower conductivity than the liquid and in the position indicated in Fig. 1, the resistance of the liquid path between the points A and C is at its maximum; as the plunger is moved upwardly from this position, the volume of liquid between the points A and C available for current flow increases until when the bottom of the plunger is at or above the contact A the resistance of the path between the points A and C is at its minimum.

In the arrangement specifically illustrated in Fig. 1, the movement of the displacement element D is effected in response to change of pressure. The tube I is comprised in one leg 2 of a manometer O whose other leg 3 is suitably connected as by pipe 4 to a point whose pressure is to be measured, such as for example to a steam header, combustion chamber, etc. As the pressure on the mercury in the leg 3 increases, the level rises in leg 2, the float F thereupon raising the displacer D to decrease the resistance of the mercury path between the immersed contacts A, C of the tube I. The resistance of the path between the points A and C therefore follows the change in pressure, and therefore measurement of this variable resistance affords a mode of determining the variations in pressure.

In the arrangement shown in Fig. 1, the variation of resistance is determined by the Wheatstone bridge method. A third contact B passes through the tube into contact with the mercury to form a conductive path between the points B and C, which preferably is equal in resistance to the minimum resistance of the path between the points A, C. The liquid resistances A—C and C—B comprise two arms of a Wheatstone bridge whose other two arms are comprised of the resistances 5, 6 and slide wire S whose values are preferably so proportioned that for balance of the bridge as indicated by zero deflections of galvanometer G, movement of the displacer element D from maximum to minimum positions, the slide wire contact S, C is adjusted from one limit of its movement to the other.

The slide wire scale Ss is suitably calibrated in the units of measurement, for example pounds per square inch. It is to be understood that the bridge may be of the self-balancing type utilizing recorder-controller mechanism for example of the type shown in Leeds Patent No. 1,125,629 and Brewer Patent 1,356,804, in which event the scale Ss is formed by the recorder chart. The bridge current may be either direct or alternating, preferably the latter for convenience, in which event, as shown, the transformer T has its secondary 7 connected to an arm of the bridge conjugate to the galvanometer arm, and its primary 8 connected to a suitable source of alternating current, for example, to a 110 volts, 60 cycle line.

It should be noted that the contacts A, B and C are permanently below the surface of the mercury, or other liquid, and are thus free from contaminating surface conditions encountered in the prior arrangements above briefly described.

Moreover, the reference arm of the circuit, i. e., between B and C, is of the same material and at substantially the same temperature as the variable arm between A and C, so that the effect of temperature is eliminated or compensated, or more generally, the effect of any cause of variation of the specific resistance of the liquid is annulled. The accuracy is not dependent upon the particular specific resistance of the liquid used.

The arrangement shown in Fig. 2 is for determination of the specific gravity of an electrolyte, which is disposed in the tube Ia to form the column of conductive liquid. The displacer element DI in this instance is the glass float of a hydrometer, the position of the displacer element as determined by the specific gravity of the liquid determining the conductance of a path between electrodes immersed in the fluid. The specific gravity may be determined by a sample removed from the main body of the liquid, or as indicated, the liquid, or a side stream thereof, may continuously flow from the pipe 9 into the tube Ia, constant level being insured by the outlet pipe 10 which is suitably above the contact A. In this modification, the displacer element DI preferably differentially varies the resistance of the two liquid arms of the bridge for departure of the specific gravity from normal although the parts may be proportioned and disposed to effect variation of only one arm as in the arrangement of Fig. 1. With the specific gravity of the desired or normal value the displacer element is in the midway position indicated, and the slide wire contact S, C is in substantially its mid position. As the specific gravity increases, the float DI rises effecting increase of the resistance of the arm A, C and concurrent decrease of the resistance of the arm B—C, requiring movement of contact S, C in clockwise direction for rebalance, and vice versa. The rebalancing adjustment may be effected manually or as in all cases herein described, may be effected automatically by mechanism of the type disclosed in the aforesaid Leeds patent.

In the modification shown in Fig. 3 the position of the displacer element D is varied in accordance with the weight of the objects disposed upon the platform II. The weight of the plunger and platform are such that when there is nothing on the platform, the displacer element D2 is balanced with its lower end opposite the contact A. If an object is now disposed upon the platform the displacer will sink until the amount of mercury displaced equals the weight of the object on the platform, and this effective removal of mercury from the conductive path between the points A and C increases the resistance between these points, and contact SC must be moved to a new position for rebalance of the network, the scale Ss being suitably calibrated in units of weight.

Figure 4:
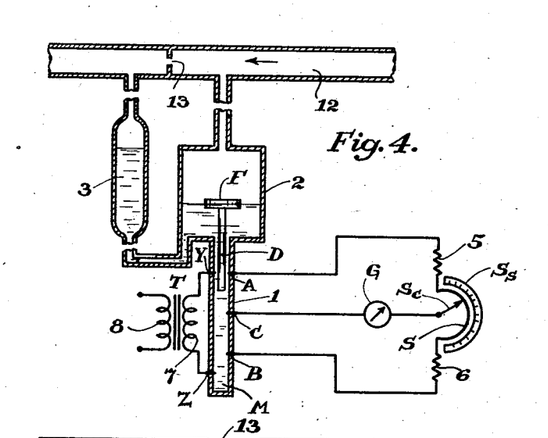
Fig. 4 illustrates a system for determining flow.

In the system shown in Fig. 4 the movement of the displacer element D is effected by variations in the rate of flow of a fluid, through the pipe or conduit 12, or more specifically, in accordance with variations in magnitude of a differential pressure produced by a restricted orifice, Venturi tube, Pitot tube, or the like, in the path of flow. In the example specifically illustrated, the manometer having the legs 2, 3, is connected across the orifice plate 13 so that the level of the liquid supporting the float F is varied by change in the rate of flow through the conduit 12; the float falling to increase the resistance between the points A, C, for increase in rate of flow and vice versa.

Figure 4A:
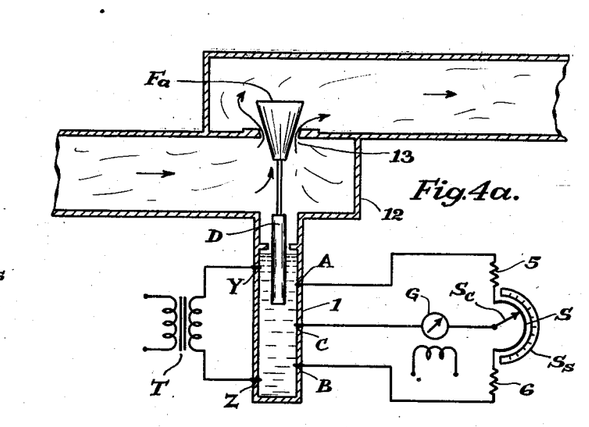
Fig. 4a illustrates another system for determining flow.

In the flow-measuring modification of Fig. 4a, the plunger or displacer D is connected to the conical valve member Fa which controls the area of the orifice 13 and whose opposite faces of unequal area are exposed to the pressures on opposite sides of the orifice. The displacer-valve assembly is supported by the mercury column; assuming that the rate of flow increases, the pressure differential acting on the valve increases and the assembly tends to rise; the upward movement of the assembly tends to reduce the pressure differential by increasing the valve opening and also tends to increase its effective weight by withdrawal of plunger D from the mercury. The assembly comes to a new position of balance when the increase of pressure-differential is balanced by the effective increase of weight of the assembly. Conversely, if the rate of flow decreases, the assembly falls until the decreased pressure differential is balanced by the decreased weight of the assembly due to further immersion of plunger D in the mercury. The position of plunger D is therefore uniquely determined by the rate of flow.

The movement of the plunger, as in the other modifications of my invention, is used to vary the conductance of an electrical path between contacts immersed in the mercury; for example, as indicated, the plunger movement varies the resistance of the column between contacts A and C, this part of the column forming an arm of a Wheatstone bridge. The bridge is rebalanced, after movement of the plunger D, by adjustment of contact SC of the slide wire S, whose scale Ss is suitably calibrated in units of flow.

Figures 5, 11:
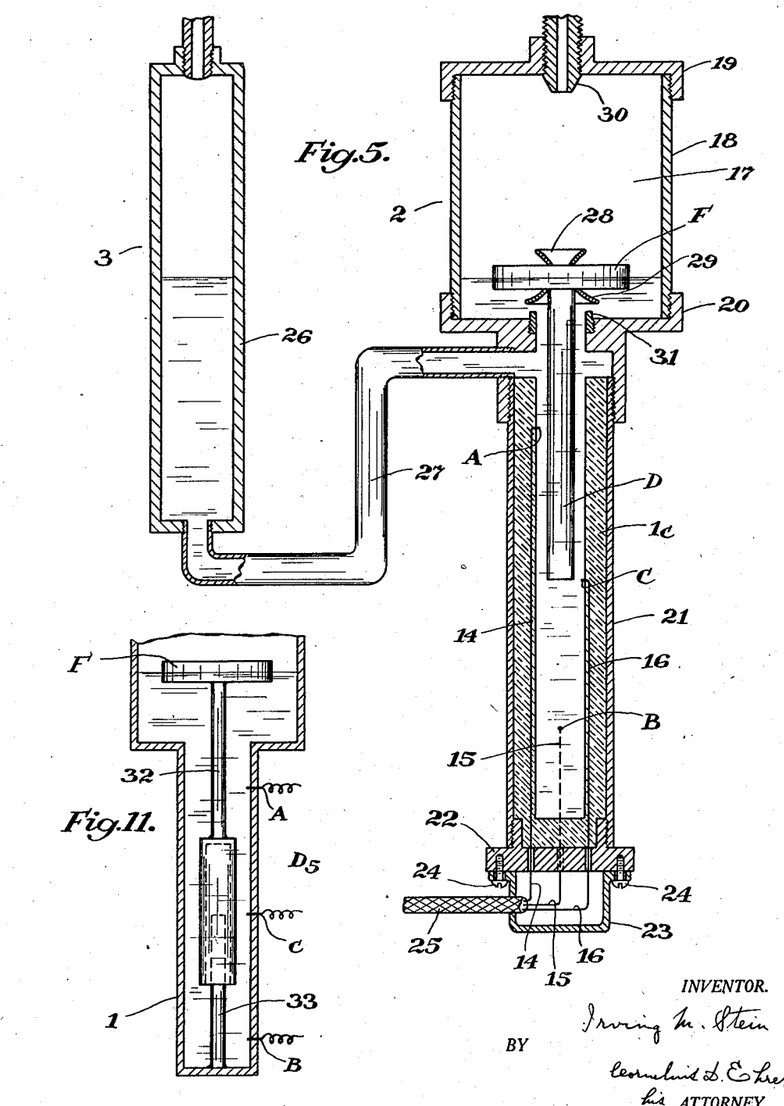
Fig. 5 is a sectional view of apparatus shown diagrammatically in Fig. 4.
Figs. 11 and 12 illustrate several modifications of the device of Fig. 5.

Fig. 5 shows more of the constructional details of the manometer-bridge device of Fig. 4. The tube 1c is of suitable insulating material, for example, molded bakelite, with contacts A, B, and C exposed in the bore of the tube, and provided with suitable conductors 14, 15 and 16 molded into the tube, and continuing beyond its lower end. The upper end of the tube is in communication with the float chamber 17 formed by the tubular member 18 whose upper end is closed by the cap 19 and whose lower end is received by the member 20. Particularly when the pressures to be measured are high, as for example when the conduit 12 is a steam header, the tube 1c is preferably reinforced, as by the seamless steel tube 21 which is threadably received by the member 20, and which at its lower end is threaded on to the steel end piece 22 molded to the tube 1c. Cap 23 is secured to the end piece 22 as by screws 24 to cover the connections of the conductors 14, 15 and 16 to the cable 25.

When the manometer fluid is mercury, the float F may be of cast iron. By way of example, the bore of the tube 1c may be one centimeter in diameter, and the outside diameter of the displacer element D may be 0.7 centimeter; for this ratio of diameters the cross sectional area of the mercury in that part of the tube containing the displacer is approximately one-half of the cross section area of the mercury column below the displacer. Also assuming that the distance between A and C, and between C and B is approximately 15 centimeters, the resistance of each of the paths in the absence of the displacer is about 0.002 ohm, and the resistance of the path between A and C with the displacer in the position shown, is approximately 0.004 ohm. Generally expressed, for the ratio of diameters given, the range of adjustment of the resistance of the path from A to C is two to one.

In this and other forms of the invention using mercury as the conductive liquid, advantage is taken of the fact that mercury is really a high resistance metal; it has a specific resistance of nearly 100 microhm centimeters, approximately the specific resistance of nichrome, as contrasted with 40 or 50 microhm centimeters for such commonly used resistance alloys, as manganin and constantan, and with 1.5 microhm centimeters for copper.

By making the displacer of tantalum, or other metal having a specific gravity greater than mercury, there is less tendency for the displacer-float system to tip against the side of the tube, and guides may be dispensed with.

The current passed from A to B is preferably quite heavy, as of the order of 25 amperes. Accordingly, the transformer secondary should be capable of supplying this current, although the transformer need only be of low wattage capacity. Suitable values for the end resistors 5, 6 and slide wire S are respectively 15, 10 and 5 ohms.

The other leg 3 of the manometer comprises a range tube 26 suitably connected as by pipe 27 to the float chamber. Simply by using different range tubes, the apparatus may be used for measuring different ranges of rates of flow. The problems of construction and insulation are simplified by having the measuring column 1 separate from the manometer leg 2 in contrast to the diagrammatic showing of Fig. 1 in which the column 1 forms part of the manometer leg 1. The manometer liquid and the measuring liquid need not be the same, for example, oil with a salt solution or oil or water with mercury.

As indicated the float F may be provided with the flexible valve members 28, 29 adapted to close the openings 30, 31 at the top and bottom of the chamber to prevent loss of the manometer liquid in the event that the device is subjected to excessive pressure, or of accidental reversal of the pressures. The connections from the transformer secondary to the bridge circuit may, as indicated in Fig. 4, extend to contacts Y, Z immersed in the liquid column.

The contacts YZ should preferably be distinct from contacts A and B to avoid introducing into the mercury or low resistance arms of the bridge extraneous voltages whose order of magnitude may be comparable with the magnitude of voltages of the mercury arms. For the same reason, the transformer secondary 7 is connected directly to the mercury arms rather than to them through conductors AS, BS.

With the simple arrangement described, the slide wire scale is non-linear in units of rate of flow, the curve Y, Fig. 6 illustrates the relation between the slide wire position and rate of flow, and curve X of the same figure indicates the relation between the differential pressure and rate of flow. The non-linear relation is due in part to the fact that the differential pressure varies as the square of the rate of flow. Compensation for the non-linear relation can be effected in any one of several different ways; for example, it may be done by shaping either the bore of the mercury tube between the points A and B, or by shaping the displacement element, so as to provide an inverse square relation between the differential pressure effecting change of position of the displacer element and the position of the slide wire contact for procurement of a linear scale in units of flow.

Figure 7:
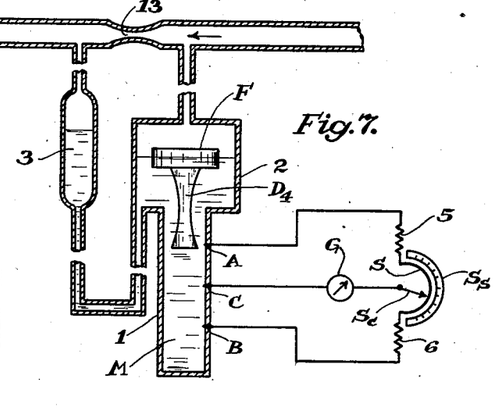
Fig. 7 illustrates a modified flow measuring system.

As shown by Fig. 7 the displacer element D4 may be shaped to compensate for departure of curve Y from the linear relation Z (Fig. 6); in general the change of ratio between the inside diameter of the tube and the outside diameter of the displacer element, in terms of distance from the lower end of the displacer member is illustrated by the curve of Fig. 8.

Figures 9, 13:
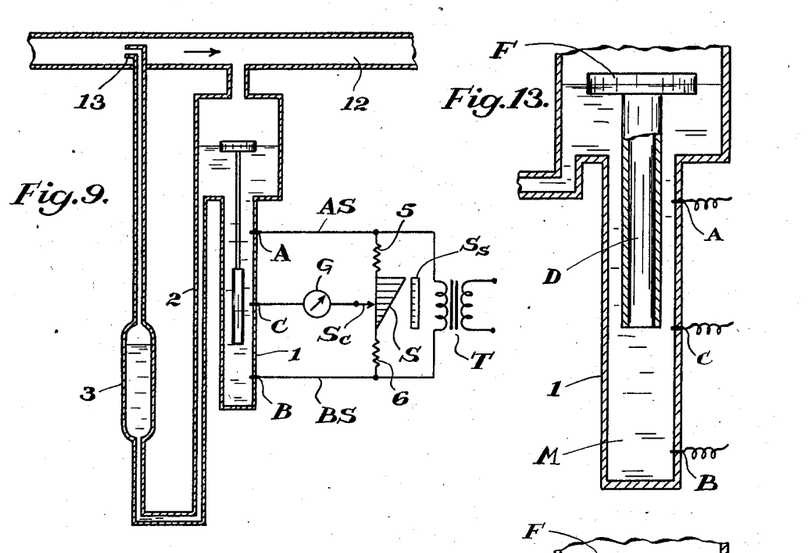
Figs. 9 and 10 are further modifications for measurement of flow.
Fig. 13 illustrates a modification using a hollow plunger.

Compensation can be more simply effected by the arrangement shown in Fig. 9 in which the diameters of the displacer and tube are uniform, and compensation is effected by suitably shaping the slide wire, for example, the slide wire may be wound on a triangular, or conical form, in either case the resistance varying as the square of the total movement of the slide wire contact as measured from one end.

Figures 10, 14, 15:
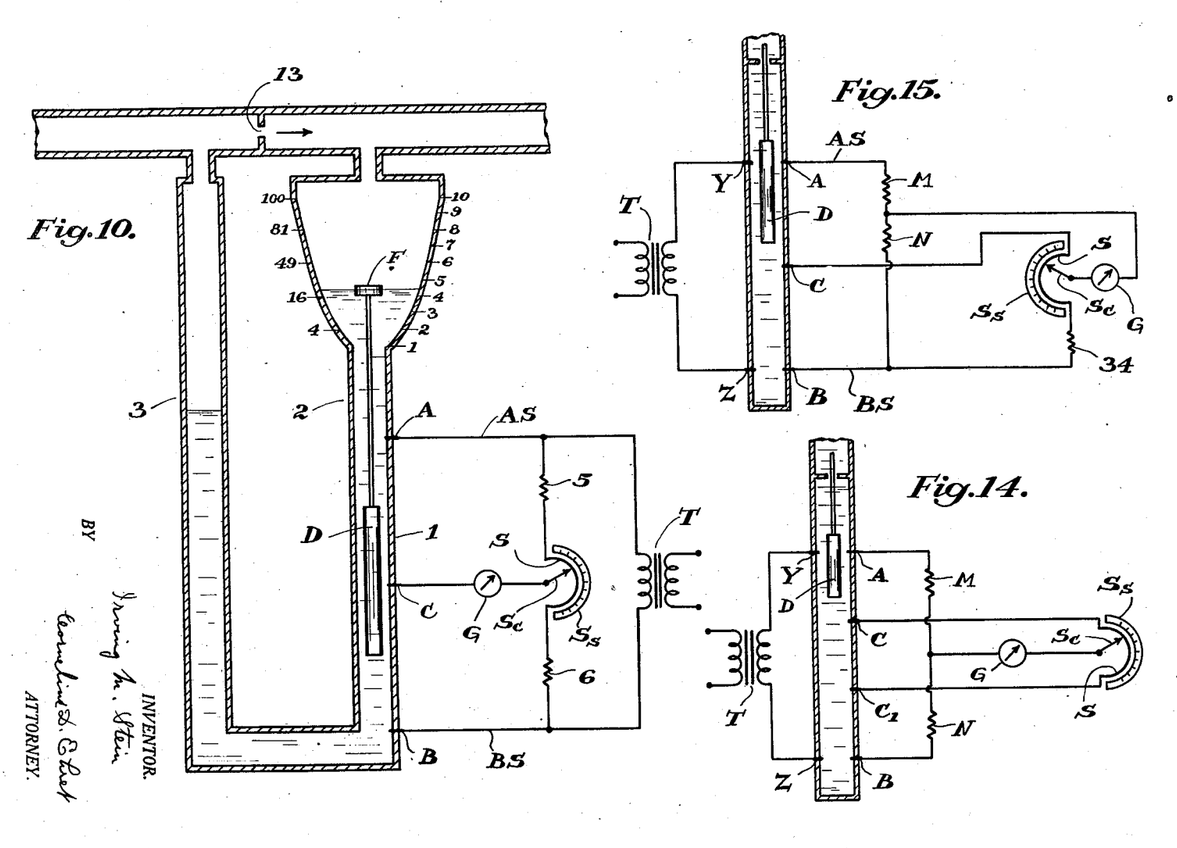
Figs. 14 and 15 illustrate circuit modifications.

Compensation can also be effected, as shown in Fig. 10, by suitably shaping the float chamber so that movement of the float varies as the square root of the differential pressure across orifice 13 or equivalent. This last arrangement is less preferable in that it does not permit of the use of range changing tubes. In all of the modifications, Figs. 7 to 10, for equal increment of change of the rate of flow the bridge is rebalanced by equal increments of adjustment of the slide wire contact, or otherwise expressed in terms of indicating or recording, the scale may be uniformly or linearly graduated in units of rate of flow.

Figures 12, 16A:
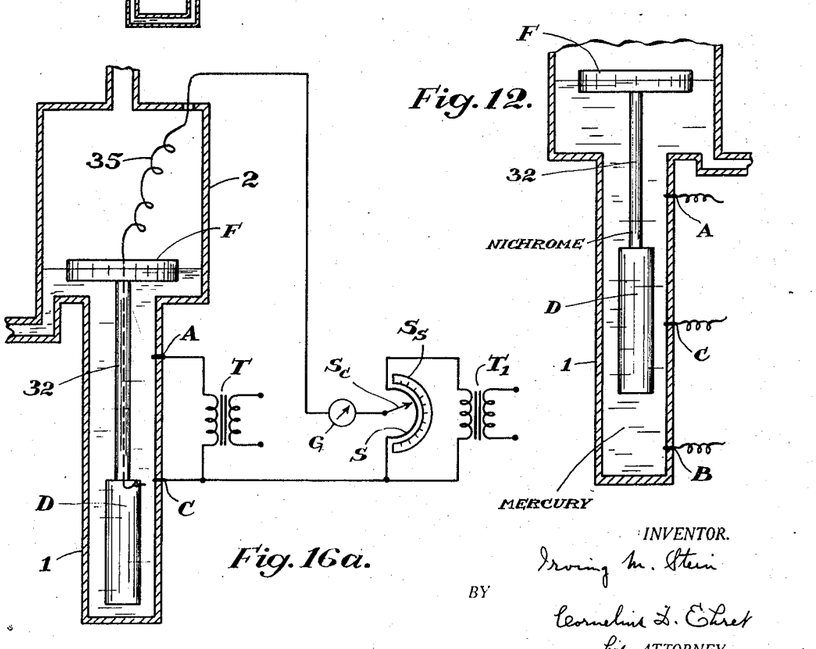
Figs. 16, 16a and 17 and 18, diagrammatically illustrate potentiometer arrangements utilizing the invention.

In arrangements such as shown in Fig. 2, in which the displacer element D1 varies the resistance of the arms differentially, the resistance change is not quite the same in the two arms due to the displacement of the rod or member 32 which connects the upper end of the displacer to the float or equivalent. This may be compensated in any one of several ways, for example, as shown in Figs. 11 and 12. In Fig. 11 the plunger or displacer element D5 may be hollow to accommodate the stationary rod 33 of cross-section equal to the cross-section of rod 32. With this construction, the variation in resistance depends only upon the position of the displacer element D5. An equivalent arrangement would be to connect rod 33 to element D5, and suitably prolong the tube 1 to provide clearance for the added length of the movable structure.

When the liquid is mercury, compensation for the rod 32 can be effected by making it of nichrome as indicated in Fig. 12, whose specific resistance is practically the same as that of mercury; if desired, the rod 32 may be provided with a copper core to effect more perfect compensation. In this modification, the resistance of the mercury displaced by rod 32 is exactly equalled by the resistance of the displacing portion of the rod.

It is not necessary that the displacer element be solid, or otherwise expressed it is not necessary that the mercury be physically displaced. As shown by Fig. 13, the displacer D may be of open-ended tubular construction. As it descends more and more mercury is electrically displaced from the path between contacts A and C; if the displacer is of insulating material, more and more mercury is removed or isolated from the electrical path; if the displacer is of metal of substantially different conductivity, as copper, more and more mercury is replaced by copper to reduce the resistance between A and C.

With a simple Wheatstone bridge circuit, such as shown in Fig. 1 for example, the movement of the slide wire contact is not a linear function of the movement of the displacer element, assuming that the tube diameter, displacer diameter, and slide wire are uniform. In the modified system of Fig. 14 for effecting a linear relation between movement of the plunger and the setting of the slide wire, the mercury column is divided into three sections by addition of contact C1, and the slide wire is connected across the middle section C, C1. The equal resistances M, N, preferably of low magnitude as for example, of the order of 3 ohms, are connected across the three mercury sections AC, C, C1; and C1, B; and the galvanometer G, or equivalent, is connected from the common terminals of resistances M, N, to the slide wire contact. Equal increments of movement of the displacer D from A to C effects increase in resistance of the section AC by equal increments. The bridge is therefore balanced in each case by moving contact Sc through equal distances.

To give a specific example of suitable circuit constants, the resistance between points A, C, varies from 0.002 ohms to 0.004 ohms for movement of the displacer; the resistance of the column between C and C1 is .001 ohm; the resistance between C1 and B is 0.003 ohm; the slide wire resistance is high compared to C—C1, for example 100 ohms; and the resistances M, N are equal, for example, 10 ohms.

The same result is obtainable with the circuit shown in Fig. 15 in which contact C1 is omitted and the slide wire S connected across points C to B in series with a resistance 34 of suitable magnitude; to give a specific example illustrative of the relation of the resistances, A—C may vary from 0.002 to 0.004 ohm; CB may be 0.004 ohm, slide wire S—50 ohms and resistance 34—150 ohms. Preferably resistances M and N are of equal magnitude; they may be of any suitable value, for example 50 ohms.

With the plunger at A, or position of minimum resistance, contact SC for balance is at the end of the slide wire connected to resistance 34; as the plunger descends, the contact SC is moved toward the other end of the slide wire until balance is obtained.

Figures 16, 17:
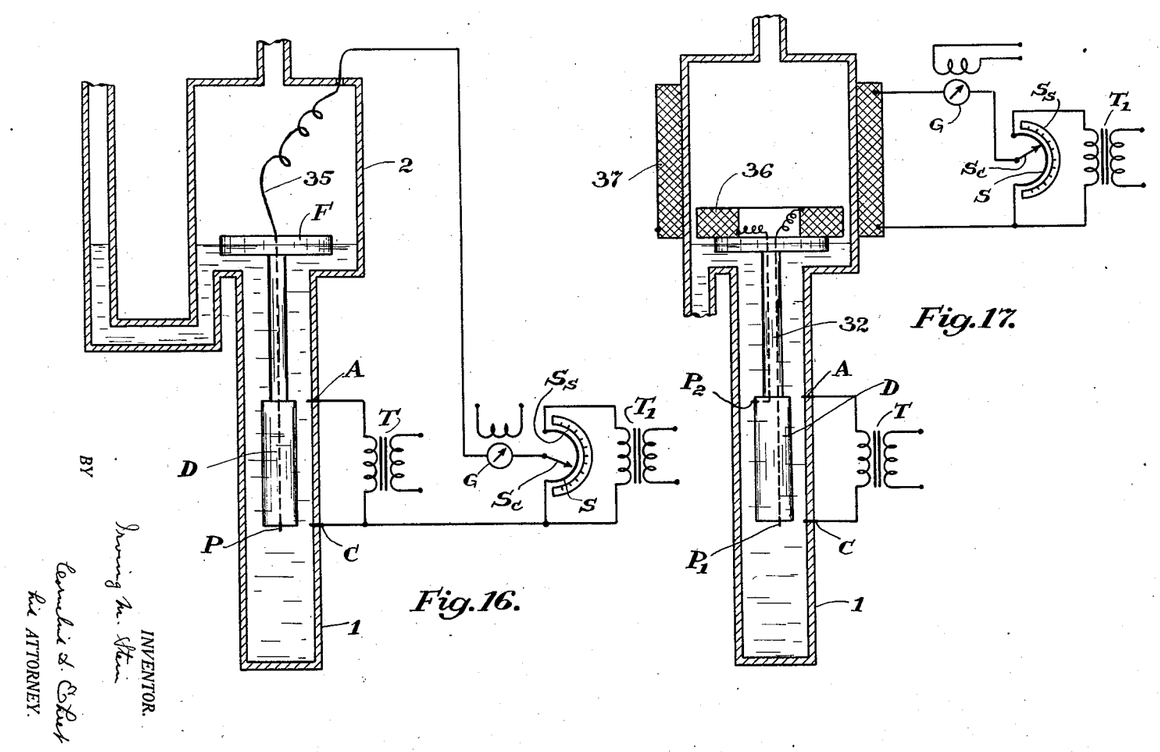

The apparatus is capable of use with other types of measuring circuits, for example potentiometer systems. Referring to Fig. 16, the contact P carried by the displacer D, is moved from A to C for change in position of the displacer and assumes a potential corresponding to its position between contacts A and C. The lead 35 for the contact P is insulated from the mercury and flexibly extends from the top of the float, or the like, for connection to the movable contact SC of the receiving slide wire S, connected across a source of current, for example the secondary S1 of a step-down transformer T1. One end of the slide wire is connected to point C for example, of the transmitting slide wire comprised of the resistance of the column between A and C.

With the plunger near its lowest position, there is little potential difference between movable contact P and fixed contact C, and accordingly the network is balanced with contact SC near the low end of its slide wire scale; as the plunger rises, the potential difference between P and C increases requiring movement of the slide wire contact toward its high end for balance of the network. The movement of the plunger may be effected in response to change of pressure, flow, etc., and the slide wire scale is calibrated correspondingly in suitable units.

With the arrangement shown in Fig. 17, use of flexible connections to the displacer system is avoided. The terminals of the coil 36, carried by the float-displacer system, are connected to contacts P1, P2 carried by the displacer. With the displacer at or near its lowest position, the current through coil 36 is at its maximum; as the float rises, the voltage difference between contacts P1, P2 decreases, effecting decrease of current in coil 36.

The coil 37 which is inductively related to coil 36 is connected to the receiving slide wire system. As the displacer D rises, the current induced in coil 37 decreases and accordingly, for balance, the slide wire contact SC is moved clockwise; conversely as the plunger D falls, the slide wire contact is moved in reverse direction for rebalancing of the network.

By modifying the construction, as by lengthening the stem 32, so that contacts P1, P2 approach the potentials of contacts A and C respectively for rise of the displacer, the voltage across coil 37 will increase for rise of the displacer and require counter-clockwise movement of the slide wire contact for balance.

Figure 18:
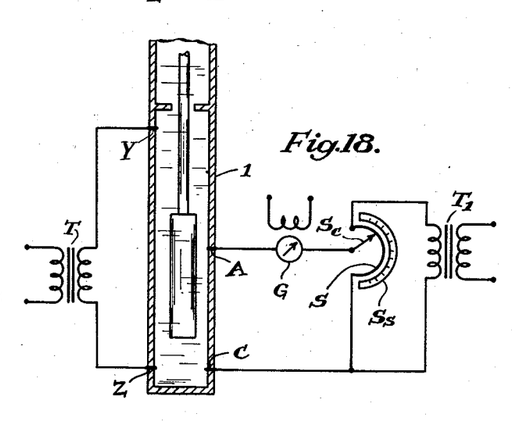

Fig. 18 also illustrates a potentiometer system and employs a displacer without attached contacts. The voltage drop from A to C is at a maximum with the displacer in its "down" position with its end opposite contact C and is at a minimum with the lower end of the displacer adjacent contact A. Accordingly for balance the slide wire contact SC is rotated in clockwise direction for upward movement of the displacer, and vice versa. The scale is suitably calibrated in units of measurement of the condition effecting change of position of the displacer.

Figures 19, 20:
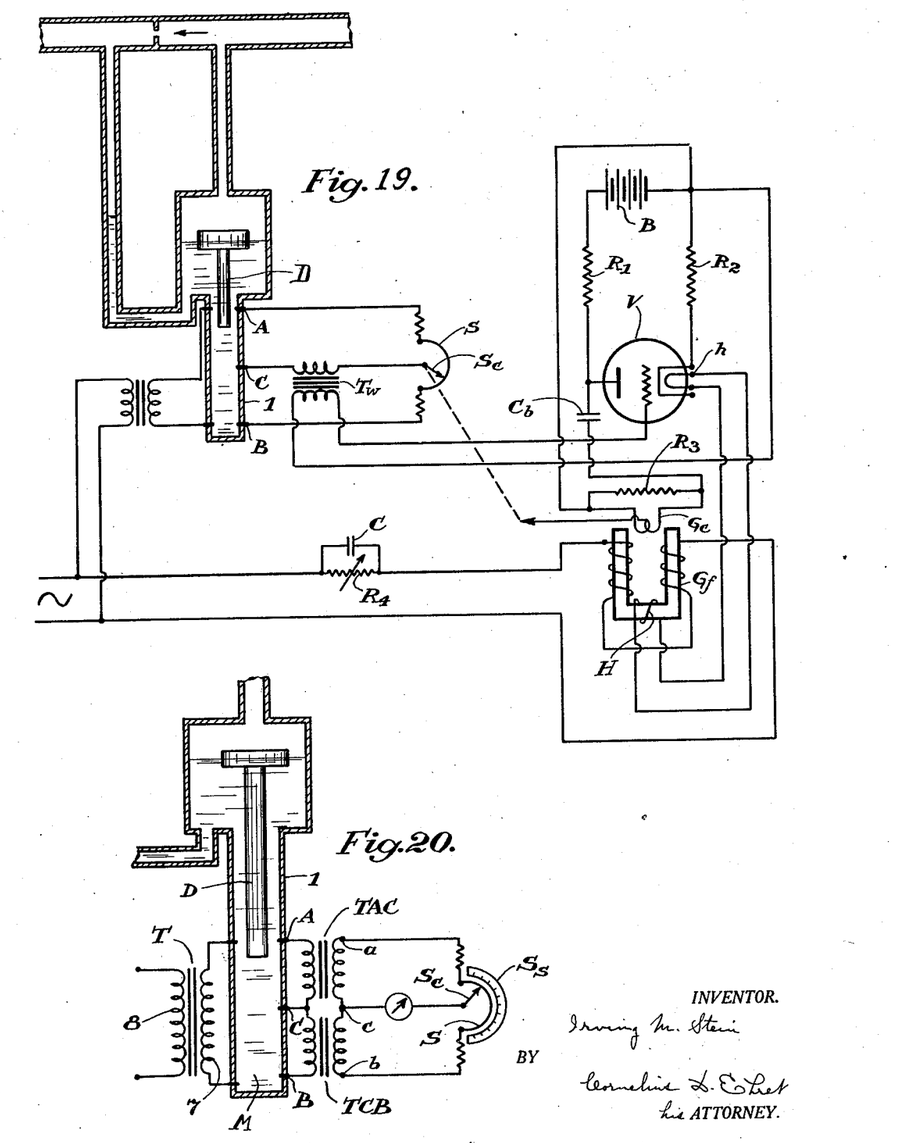
Figs. 19 and 20 illustrate modifications for obtaining enhanced sensitivity.

In installations where it is necessary or desirable to use a galvanometer of relatively low sensitivity, it may be necessary to amplify the unbalance current of the measuring network, particularly if high degree of accuracy is required. As shown in Fig. 19, the galvanometer G in the conjugate arm of the bridge is replaced by the primary of transformer Tw, which is preferably of the step-up type having for example a step-up ratio of one to ten. The secondary of the transformer is connected to the grid and cathode of a thermionic tube, for example, one of the 27 type.

The movable coil Gc of the galvanometer is connected between the plate and cathode of the tube in series with a blocking condenser Cb of such capacity, for example 4 mfds, that it offers low impedance to the alternating component of the plate current produced by unbalance of the measuring network. Current from the battery B or equivalent direct current plate supply source is prevented from flowing through the galvanometer coil by the condenser.

The resistance R1 should be of suitably high value, for example, of the order of 20,000 ohms so that of the two external paths from plate to cathode, the one containing the galvanometer coil is of substantially lower impedance. Resistance R2 is traversed by the plate current and is utilized to provide a biasing voltage for the grid of the tube.

Resistance R3 is the damping resistance of the galvanometer; it may be of about 1600 ohms resistance, and coil Gc may be of about 1300 ohms resistance.

The field Gf of the galvanometer is supplied from the source of alternating current which also supplies the transformer Tw of the measuring network. The phasing network R4 C2 is adjusted to obtain maximum galvanometer sensitivity. If desired the current for the heater h of the tube may be supplied from an extra winding H on the field core.

Upon movement of displacer D, the bridge is unbalanced causing current to flow through the primary of transformer Tw whose secondary thereupon impresses on the grid of amplifier tube 4 an alternating voltage whose magnitude is determined by the extent of unbalance. The magnitude of alternating current produced in the plate circuit of the tube for energization of the galvanometer coil is many times the unbalance current of the bridge so that there is substantial deflection of the galvanometer for even slight movement of the displacer. As contact SC is moved to rebalance the network the current in the primary of transformer Tw decreases and accordingly the amplified current in coil Gc decreases and eventually becomes zero when the bridge is balanced. As in previously described modifications, the rebalancing may be effected manually or by recorder-controller mechanism of the type shown by the aforesaid Leeds or Brewer patents which mechanism may also effect a control of the measured condition.

A simpler arrangement for obtaining enhanced sensitivity is shown in Fig. 20. In this modification, the two mercury sections A—C and C—B instead of being directly included in the bridge circuit are indirectly included therein by the transformers TAC, TCB, each having a suitably high step-up ratio for example, of the order of 1 to 40 and suitably low primary impedance. The transformers are so poled that the voltage produced between the points $a$ and $c$ is in opposition to the voltage produced between the points $c$ and $b$. A change in the voltage impressed on the primary of transformer TAC, for example, resulting from movement of displacer D between A and C results in much larger change of the voltage between points $a$—$c$ of the bridge circuit due to the voltage step-up of the transformer. It is apparent that step-up transformers may similarly be used in any of the modifications of Fig. 1 to 18. As the load is light, the transformers can be small, for example, they may have a rating of about 5 watts.

Figure 21:
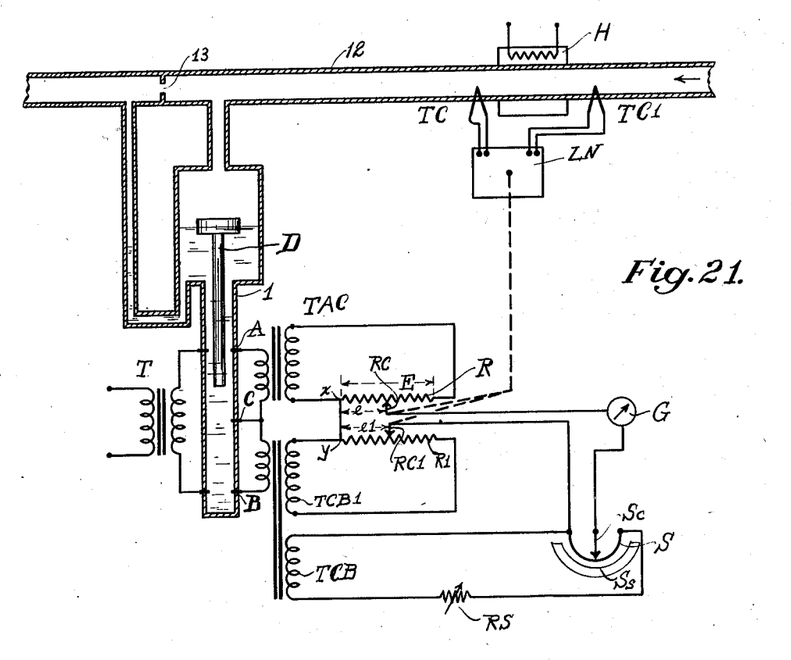
Fig. 21 illustrates another modification.

In the modification shown in Fig. 21, fluid flowing to the orifice 13 or equivalent is heated or cooled by device H, generically representative of any heat transfer apparatus. The displacer D, for example, is so shaped that the voltage across resistance R is substantially proportional to the rate of flow of the fluid, i. e. the square root of the pressure differential across orifice 13.

The position of contact Rc is varied in accordance with change in temperature of the fluid effected by the device H. Specifically, the thermocouples TC, TC1 measure the temperature difference of the incoming and outgoing fluid and by means of any suitable device LN, such as, for example, a controller of the type shown in Schofield Patent 1,791,383, effect movement of contact Rc. The voltage $e$ between the contact RC and point $x$ is, therefore, a function of both flow and temperature difference so that the slide wire scale Sc may be calibrated in B. t. u.'s, or other heat units.

As thus far described, the point $x$ and contact Rc would be connected to the slide wire contact Sc and to one of the slide wire terminals respectively. However, as the voltage drop between A and C approaches a minimum finite value rather than zero, the relation between voltage E across resistance R is more accurately expressed by the proportionality $$E \alpha K \pm \sqrt{H}$$

H is the pressure differential across the orifice, and
K is a constant and the voltage $e$ between contact Rc and point $x$ is therefore expressed by the proportionality $$e\alpha(K+ \pm \sqrt{H})(T_1 - T_2)$$

$$K(T_1 - T_2) \pm \sqrt{H}(T_1 - T_2)$$

where $$(T_1 - T_2)$$

is the change of temperature of the liquid. The component $$K(T_1 - T_2)$$

of voltage $e$ represents an error which is the greater the greater the transfer of heat between the heater H and the liquid.

In the system of Fig. 21, this variable component is cancelled out by connecting in series with voltage $e$, a voltage developed between the contact Rc1 and point $x$ of the circuit comprising resistance R1 which is connected across the secondary winding TCB1. The total voltage across resistance R1 is substantially constant since the primary winding is connected across the points C and B.

The contact Rc1 is coupled for movement by the controller LN so that its position is a function of the temperature difference $$T_1-T_2.$$

The voltage between contact RC1 and point $y$ is therefore proportional to $$K(T_1-T_2).$$

The polarities of the windings are such that the voltage $e1$ is in opposition to $e$, and the circuit constants are so chosen that $e1$ is equal to the component $$K(T_1-T_2)$$

of voltage $e$. The slide-wire scale Sc therefore directly affords a compensated reading in heat units.

The same system can be used to measure flow corrected for temperature or pressure. In this case, the movement of the contacts Rc, RC1 is effected by a suitable temperature or pressure-responsive device instead of by thermocouples TC, TC1. For compensation for both temperature and pressure, one of the responsive devices would effect movement of contacts RC, RC1, and the other of the devices would similarly shift the points $x$ and $y$ along the resistances R and R1, respectively.

The variable resistances RS, suitably calibrated, may be provided in series to the slide wire to permit variation of the measuring range to adapt the system to different installations or different operating conditions.

While I have illustrated various specific forms and uses of my invention, it is understood that my invention is not limited thereto but is coextensive in scope with the appended claims.

For brevity in the appended claims, the term "displace" comprehends electrical isolation and is not specific to physical displacement unless so limited by the context.

What I claim is:

1. An electrical measuring system comprising a column of conductive liquid, contacts immersed in said liquid, and a plunger movable toward one or the other of said contacts differentially to vary the conductances between said contacts and an intermediate contact by displacing liquid from the electrical path between one of said contacts and said intermediate contact and by allowing replacement of liquid to the electrical path between the other of said contacts and said intermediate contact, a supporting member for said plunger, and means for compensating for the displacement of liquid by said supporting member.

2. An electrical measuring system comprising a column of conductive liquid, contacts immersed in said liquid, reciprocable structure movable to displace liquid from the electrical path of fixed length between a pair of said contacts, a slide-wire connected in parallel to the path of fixed length between another pair of said contacts, and current-responsive means connected between a contact adjustable along said slide-wire and a point of fixed potential.

3. An electrical measuring system comprising a column of mercury, contacts immersed in said column to provide an electrical path of fixed length, a plunger having electrical conductivity substantially different from the electrical conductivity of said liquid and movable in said column to vary the conductance of said path of fixed length between said contacts, other contacts immersed in said column to provide a current path of fixed length, and means for supplying currents of substantial magnitude connected to said other contacts.

4. A system for measuring flow comprising means producing a differential pressure varying as the square of the rate of flow, a column of mercury, contacts immersed in said column, a balanceable network, a movable plunger in said column responsive to said means to vary the conductance of the electrical path between said contacts thereby to unbalance said network, and flow-calibrated means for rebalancing said network adjustable to equal extents for balancing the unbalance effected by equal increments of change of rate of flow.

5. An electrical measuring system comprising a column of conductive liquid, means for conducting current thereto, contacts continually immersed in said liquid spaced axially of said column to provide a current path of fixed length, liquid displacing structure movable axially of said column in response to changes in magnitude of said condition, the range of movement of said structure substantially corresponding to the distance between said contacts, and electrical measuring means responsive to changes in conductance of the column between said contacts effected by movement of said structure.

6. An electrical measuring system comprising a tube of insulating material, a column of conductive liquid therein, a step-down transformer, contacts extending through said tube and continuously immersed in said liquid connected to the secondary of said transformer, measuring circuit contacts extending through said tube and continuously immersed in said liquid, and structure movable in said tube in response to changes in magnitude of a condition to effect changes in the resistance of the column between said measuring circuit contacts which are substantially greater than any concurrent changes in the resistance of the column between said first contacts.

7. An electrical measuring system comprising a column of conductive fluid, a source of current, contacts continuously immersed in said column for conducting current thereto from said source, measuring circuit contacts at least one of which is other than said first contacts, and liquid-displacing structure movable in said column in response to changes in magnitude of a condition to effect substantial change in the voltage difference between said measuring circuit contacts and insubstantial change in the current flow between said first contacts.

8. An electrical measuring system comprising a column of conductive fluid, contacts continuously immersed in said column, a float supported by said column responding to changes in level thereof, and a plunger of material of greater density than said liquid depending from said float and moving therewith to vary the conductance of said column between said contacts.

9. An electrical measuring system comprising a column of conductive fluid, contacts continuously immersed in said column and providing a current path of fixed length, a source of current connected to said contacts, a measuring network including conductors extending to axially spaced contacts immersed in said column and at least one of which is intermediate said first-named contacts, and means for varying the potential difference between said last-named contacts due to flow of current between said first-named contacts comprising structure of specific conductance substantially different from the specific conductance of said liquid and movable within said column in response to the changes in magnitude of a condition to vary the distribution of potential along said path.

10. An electrical measuring system comprising a column of conductive fluid, contacts continuously immersed in said column and providing a current path of fixed length, a source of current connected to said contacts, a measuring network including conductors extending to axially spaced contacts immersed in said column and at least one of which is intermediate said first-named contacts, means for varying the potential difference between said last-named contacts due to flow of current between said first-named contacts comprising structure of specific conductance substantially different from the specific conductance of said liquid and movable within said column in response to the changes in magnitude of a condition to vary the distribution of potential along said path, means responsive to the change in magnitude of said potential difference, and calibrated impedance means in said network adjustable to restore said responsive means to non-responsive state for any position of said structure.

11. An electrical measuring system comprising a column of conductive liquid, contacts spaced axially of said column to provide in the liquid a path of fixed length and whose resistance is less than an ohm, means for applying voltage to said contacts to effect flow in said path of current whose magnitude is substantially greater than one ampere, structure of specific conductance substantially different from the specific conductance of and immersed in said liquid movable in said path of fixed length in response to the changes in magnitude of a condition to change the distribution of potential in said path, a measuring network, and conductors therefrom to axially spaced contacts in said column and at least one of which is intermediate said first-named contacts.

12. An electrical measuring system comprising a column of conductive liquid, contacts spaced axially of said column to provide a current path of fixed length, a source of current connected to said contacts, a measuring network including conductors extending to axially spaced contacts in said column at least one of which is intermediate said first-named contacts, and means for varying the voltage difference between said last-named contacts due to flow of current between said first-named contacts comprising structure of specific conductance substantially different from the specific conductance of said liquid movable within said column in said path in response to the changes in magnitude of a condition and whose effective range of movement is not greater than the axial spacing of said first-named contacts.

13. An electrical measuring system comprising a column of conductive fluid, contacts continuously immersed in said column and providing a current path of fixed length, a source of current connected to said contacts, a measuring system comprising contacts spaced axially of said column therein to provide electrical paths each of fixed length, and means for varying the difference between the voltage drops across said last-named paths due to flow of current between said first-named contacts comprising structure of specfic conductance substantially different from the specific conductance of said liquid and movable within said column in response to changes in magnitude of a condition.

IRVING M. STEIN.